United States Patent [19]

Hartley

[11] Patent Number: 5,417,113
[45] Date of Patent: May 23, 1995

[54] LEAK DETECTION UTILIZING ANALOG BINAURAL (VLSI) TECHNIQUES

[75] Inventor: Frank T. Hartley, Arcadia, Calif.

[73] Assignee: The United States of America as represented by the Administrator of the National Aeronautics and Space Administration, Washington, D.C.

[21] Appl. No.: 111,317

[22] Filed: Aug. 18, 1993

[51] Int. Cl.⁶ .................................. G01M 3/24
[52] U.S. Cl. ............................ 73/587; 73/592; 381/68.2; 367/125
[58] Field of Search ............. 73/40.5 A, 587, 592, 73/659; 381/68.2, 68.4, 92; 367/125, 127, 129

[56] References Cited

U.S. PATENT DOCUMENTS

| | | | |
|---|---|---|---|
| 3,792,423 | 2/1974 | Becker et al. | 73/620 |
| 3,979,712 | 9/1976 | Ettenhofer et al. | |
| 4,028,934 | 6/1977 | Sollish | 73/620 |
| 4,327,576 | 5/1982 | Dickey et al. | 73/40.5 A |
| 4,640,121 | 2/1987 | Leuker et al. | 73/40.5 A |
| 4,641,526 | 2/1987 | Izumi et al. | 73/587 |
| 4,785,659 | 11/1988 | Rose et al. | 73/40.5 A |
| 4,858,462 | 8/1989 | Coulter et al. | 73/40.5 A |
| 5,058,419 | 10/1991 | Nordstrom et al. | 73/40.5 A |
| 5,101,774 | 4/1992 | Marziale et al. | 73/40.5 A |
| 5,103,675 | 4/1992 | Komninos | 73/592 |
| 5,117,676 | 6/1992 | Chang | 73/40.5 A |
| 5,161,408 | 11/1992 | McRae et al. | 73/40.5 A |

OTHER PUBLICATIONS

Analog VLSI Model of Binaural hearing by Carver A. Mead et al–IEEE Transactions on Neural Networks 1991 vol. 2; pp. 230–236.

*Primary Examiner*—Hezron E. Williams
*Assistant Examiner*—Helen C. Kwok
*Attorney, Agent, or Firm*—John H. Kusmiss; Thomas H. Jones; Guy M. Miller

[57] ABSTRACT

A detection method and system utilizing silicon models of the traveling wave structure of the human cochlea to spatially and temporally locate a specific sound source in the presence of high noise pandemonium. The detection system combines two-dimensional stereausis representations, which are output by at least three VLSI binaural hearing chips, to generate a three-dimensional stereausis representation including both binaural and spectral information which is then used to locate the sound source.

12 Claims, 6 Drawing Sheets

LEAK DETECTION UTILIZING ANALOG BINAURAL (VLSI) TECHNIQUES

ORIGIN OF THE INVENTION

The invention described herein was made in the performance of work under a NASA contract, and is subject to the provisions of Public Law 96-517 (35 U.S.C. § 202) in which the Contractor has elected not to retain title.

TECHNICAL FIELD

The subject invention relates to a method and apparatus for spatially and temporally locating specific noise sources of particular frequencies and spectra in the presence of high noise pandemonium. Generally, the invention finds utility in the location of leaks or impacts in hulls, airlocks, plates, pipe work or in any structure or medium supporting the propagation of acoustic waves.

BACKGROUND ART

Various systems using a pair of detectors to determine the spatial position of a leak in a piping system have been proposed. For example, according to Coulter et al., U.S. Pat. No. 4,858,462, a pair of spaced-apart detectors may be attached to a piping system. The phase difference between the signals is correlated to correspond to the difference in travel time of the acoustic signals to each of the detectors. By measuring this offset, the relative position of the acoustical emission, and thus the relative position of the leak, is determined. A threshold detection level is set to remove background noise. Coulter et al. note that multiple detectors could be utilized to determine a three-dimensional position within a volume.

Nordstrom et al., U.S. Pat. No. 5,058,419, provides another example of an acoustic pipe leak detection system having remote sensors, wherein the time lag between the output of each of the sensors is calculated at a plurality of frequencies. The time delay value which occurs most frequently from these calculations is utilized to calculate the sound source position.

These and other prior art autocorrelative approaches are inadequate because they fail to teach a detection system capable of both identifying and spatially locating signals in the presence of overwhelming levels of background noise.

STATEMENT OF THE INVENTION

It is an object of the invention to identify and spatially locate signals in the presence of overwhelming levels of background noise.

While the invention is applicable to various types of signals, it is a particular object of the invention to provide a method and apparatus for identifying and spatially locating acoustic signals in the presence of such noise.

It is a further object to provide a detection system yielding frequency and phase-discriminating characteristics markedly superior to conventional autocorrelation of groups of narrow-band frequency correlations of monaural sound inputs.

According to the invention, specific noise sources of particular frequencies and spectra are spatially and temporally located in the presence of high noise by providing the output of a plurality of transducers to a detection system utilizing VLSI (very large scale integration) circuit realizations of a cochlea transform in conjunction with a stereausis algorithm.

According to a preferred embodiment for identifying and locating acoustic signals, the VLSI circuit constitutes a silicon model of the traveling wave structure of the human cochlea. Each VLSI circuit receives two inputs from left and right transducers. The stereausis representation generated by a silicon cochlea circuit provides information within the two-dimensional plane formed by three points: the source of the acoustic signal; the location of the left transducer; and the location of the right transducer. Spatial information (i.e., distance and direction) and spectral information (i.e., frequency), within the two-dimensional (2-D) plane described above, are generated by and present in the output of the stereausis chip. Particular patterns of these data are associated with acoustic signals originating from a particular location and having particular spectral characteristics.

Multiple 2-D stereausis representations, in different 2-D planes, are calculated by using multiple VLSI chips. The respective left and right transducers are positioned within the acoustic energy conducting medium to define multiple, nonparallel 2-D planes. The information provided by multiple 2-D stereausis representations is collectively manipulated to render a 3-D stereausis representation. Such a 3-D representation includes a "signature" indicating the distance, direction, and frequency of an acoustic signal in the conducting medium. A preferred detection system thus concatenates the outputs of multiple stereausis chips, and may apply a topology transform to compensate for the acoustic properties characteristic of the conducting medium, to provide a three-dimensional (3-D) stereausis representation of an acoustic signal yielding both spatial and spectral information.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE INVENTION

The following description is provided to enable any person skilled in the art to make and use the invention and sets forth the best modes contemplated by the inventor of carrying out his invention. Various modifications, however, will remain readily apparent to those skilled in the art.

Figure 1:
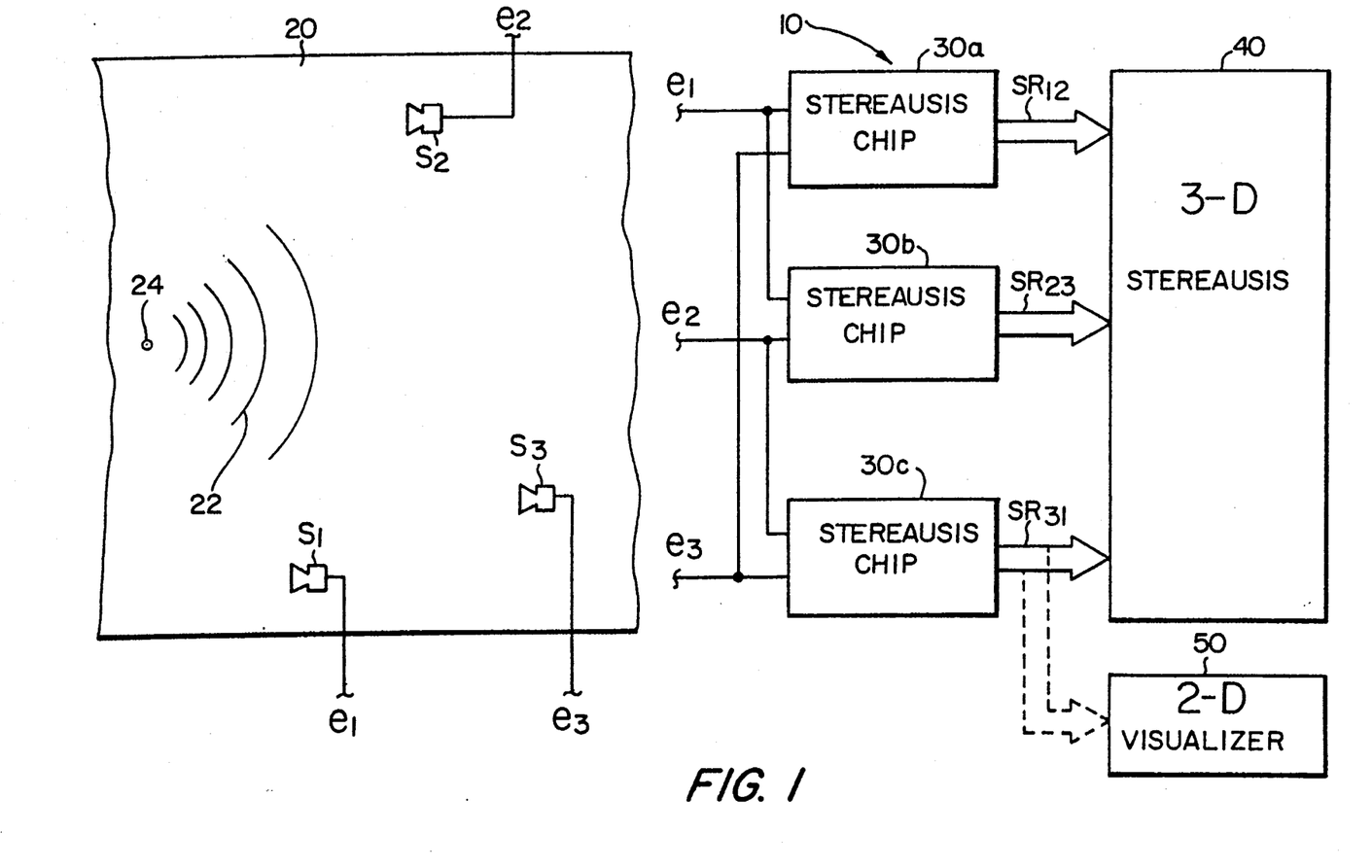
FIG. 1 is a schematic block diagram of an audible signal detection system according to the preferred embodiment.

FIG. 1 shows a block diagram of a detection system 10 according to the preferred embodiment. This block diagram illustrates an acoustic energy-conducting medium 20 through which acoustic signals 22 propagate. Although illustrated as a pipe, acoustic medium 20 may be a solid, liquid, or gas. The acoustic signal may be in the audible or inaudible range. While the preferred embodiment is disclosed in the context of acoustic signal detection, those skilled in the art will appreciate its extension to various other signals in different portions of various spectra. One typical example of an acoustic signal source is a hole 24 in pipe 20, comprising a source of an audible signal 22.

Detection system 10 comprises at least three stereausis chips 30a, 30b, and 30c, and a 3-D stereausis processor 40. Each stereausis chip 30 is a silicon model of a left and right cochlea, and is preferably realized in a VLSI binaural hearing model chip utilizing a stereausis algorithm. Such chips are per se known, for example, as disclosed in the article entitled "Analog VLSI Model of Binaural Hearing," IEEE Transactions On Neural Networks, 1991, Vol. 2, pp. 230–36.

The VLSI hearing model chip 30a–30c receives left and right inputs from two of several transducers $S_1$, $S_2$, $S_3$, which output respective output signals $e_1$, $e_2$, and $e_3$. In the specific embodiment under discussion, successive samples of the analog outputs $e_1$, $e_2$ of respective geophones $S_1$ and $S_2$ located on the pipe 20 are provided as inputs to stereausis chip 30b. Generally speaking, stereausis chips 30a, 30b, and 30c perform parallel processing, filtering and nonlinear thresholding, thereby providing 2-D stereausis representations as inputs to the 3-D stereausis representation processor 40 and optionally to a 2-D color visualizer 50. The optimal positioning of the transducers depends upon where emission energy resides or where a component spectrum exhibits a superior signal level to that of background bedlam.

Each VLSI hearing model chip 30a, 30b, 30c, with its two inputs, models early auditory processing in the brain. The stereausis model of biological auditory processing, a principal building block of the disclosed detection system 10, provides a 2-D stereausis representation that encodes both binaural and spectral information in a unified framework. One of the stereausis chips 30a–30c, which compute the respective stereausis output representations $SR_{12}$, $SR_{23}$, and $SR_{31}$ in real time, using adapting analog, continuous time processing, is shown in greater detail in FIG. 2.

Figure 2:
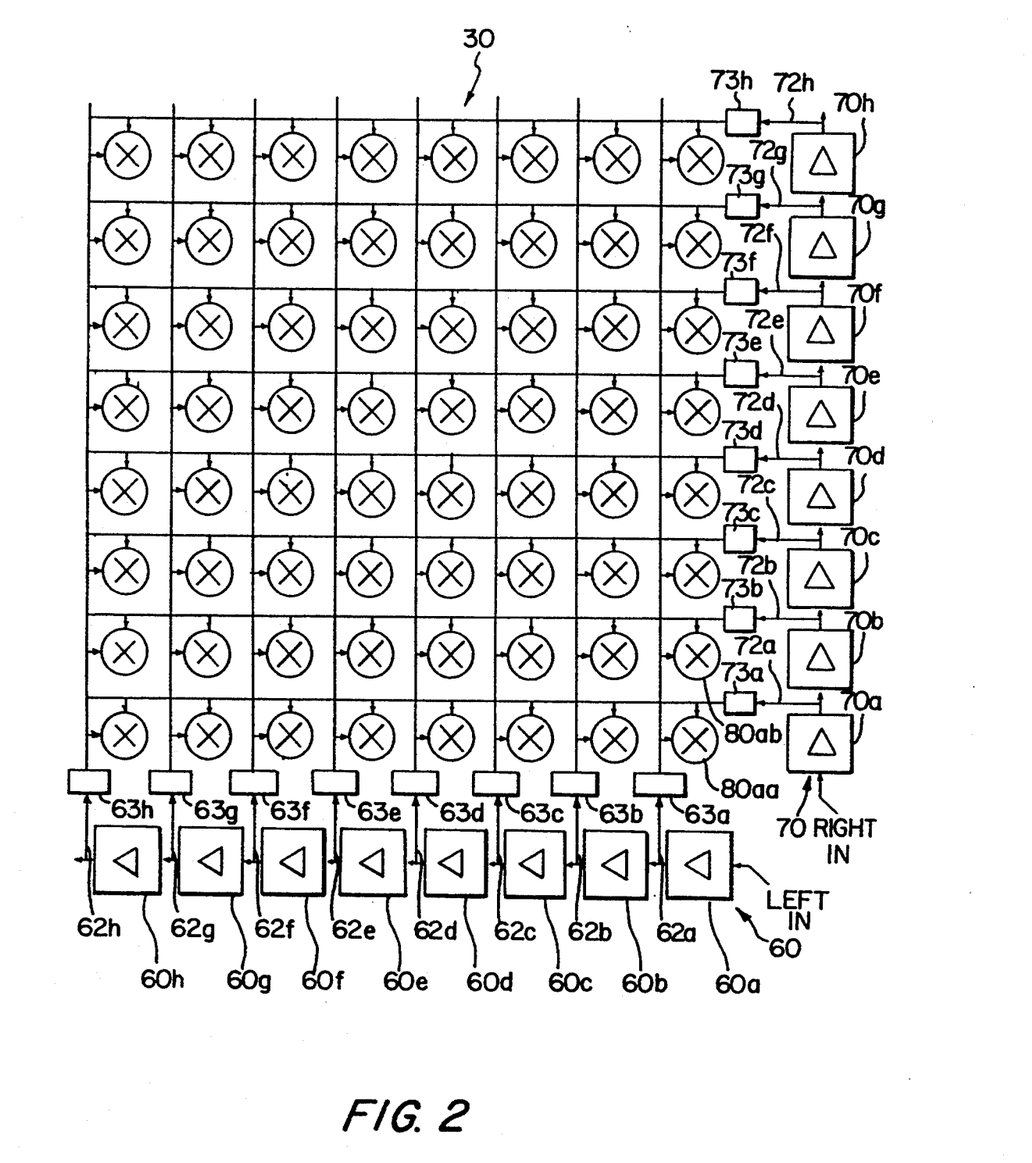
FIG. 2 is a schematic circuit diagram of a stereausis chip.

Each VLSI hearing model chip 30a–30c, which may be described as an auditory processing means, includes a first one-dimensional (1-D) array of analog processors $60_a$, $60_b$, $60_c$, $60_d$, $60_e$, $60_f$, $60_g$, $60_h$, ... interconnected by a first plurality of output lines $62_a$, $62_b$, $62_c$, $62_d$, $62_e$, $62_f$, $62_g$, $62_h$, ..., a second one-dimensional array of analog processors $70_a$ ... $70_h$ interconnected by a second plurality of output lines $72_a$ ... $72_h$, and a 2-D array of analog comparison elements $80_{aa}$, $80_{ab}$, ....

Each 1-D array, drawn as a cascade of boxes containing the symbol Δ, is a silicon realization of a cochlea and, as such, physically models the traveling wave structure within the human ear. In a preferred embodiment, both first and second 1-D arrays are implemented as a cascade of 56 second-order sections with exponentially-scaled time constants. The arrays may be, but are not necessarily, tuned to approximately two decades, 100 Hz to 12 kHz. Each processor of the silicon cochlea, e.g. $60_a$, is cascaded to input to the subsequent silicon cochlea, e.g. $60_b$. As seen in FIG. 2, the respective output taps of each second-order section $60_a$ ..., $70_a$ ..., are connected to nonlinear circuit models of sensory transduction $63_a$ ... $63_h$, $73_a$ ... $73_h$. Sensory transduction means $63_a$ ..., $73_a$ ..., time differentiate, nonlinear waveshape, and half-wave rectify the tap outputs $62_a$ ..., $72_a$ ..., at each tap along the cascade of filters, and provide outputs to the 2-D array of comparison elements as a first plurality of positive inputs and as a second plurality of negative inputs (opposite in polarity).

Figure 3:
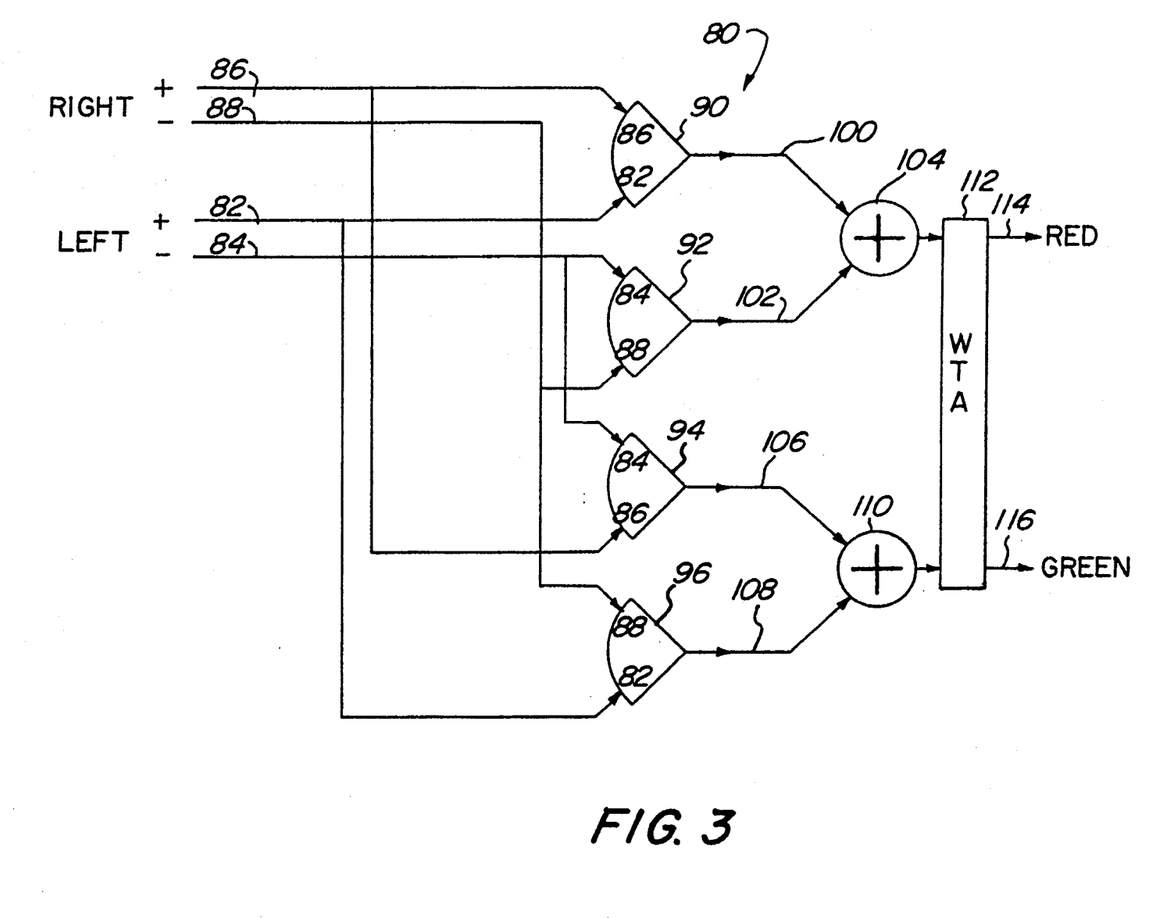
FIG. 3 is a schematic circuit diagram illustrating a comparison element within the stereausis chip according to the preferred embodiment.

While FIG. 2 shows output lines $62a$, $62b$, ... and $72a$, $72b$, ..., which define a time-delayed conductor matrix, FIG. 3 better illustrates that each comparator element 80, in fact, receives, as inputs, a first positive input 82 and a first negative input 84 (from first 1-D array 60) and a second positive input 86 and a second negative input 88 (from second 1-D array 70).

As shown in FIG. 2, each comparator element 80 is drawn as a circle marked with a cross. As shown in FIG. 3, each comparator element 80 includes four correlation processors 90, 92, 94, 96. Respective first positive and negative inputs 82, 84 and respective second positive and negative inputs 86, 88 are distributed to each of the correlation processors 90, 92, 94, 96. The outputs of the first and second correlation processors 90, 92 are inputted on lines 100, 102 to a summation circuit 104. The analog outputs of the third and fourth correlation processors 94, 96 are fed on output lines 106, 108 to a second summation circuit 110. The outputs of the summation circuits 104, 110 are fed to a "winner-take-all" network 112, one embodiment of which provides respective "red" and "green" outputs 114, 116 that will enable visualization on a monitor 50. As may be appreciated, FIG. 2 does not show the entire matrix of comparison elements 80; there are 3136 analog four-quadrant correlator circuits 80 on the preferred chip 30.

In operation, the left and right signal inputs ($e_1$, $e_2$) enter silicon cochleas 60, 70 at the lower-right corner of FIG. 2. The first and second 1-D arrays act both to filter their respective input signals and to delay the signals in time. To symbolize this delay, the cochleas are shown as a cascade of boxes labeled Δ, which border the bottom and right edges of the figure.

The center matrix of the chip 30 computes the correlation of every left-cochlea output 62 with every right-cochlea output 72 in parallel. With reference to FIG. 3, the correlation processors 94, 96 compare the positive portion, e.g., 86, of one input with the negative portion, e.g., 84, of the other input and thus compute the anticorrelation of the two inputs. The other two processors 90, 92 respectively compare the positive inputs 82, 86 and the negative inputs 84, 88 and thus compute the correlation of inputs. The two-input nonlinear winner-take-all network 112 compares these correlation and anticorrelation inputs. Such winner-take-all networks are per se known, for example, as disclosed in Lazzaro, J. P., Ryckebusch, S., Mahowald, M. A., and Mead, C. (1988), *Winner-Take-All Networks of O(n) Complexity*, in Tourestzky, D. (ed), *Advances in Neural Information Processing Systems* 1. San Mateo, Calif.; Morgan Kaufmann Publishers, pp. 703–711.

The 2-D array performs a superposition of the left and right cochleas 60, 70. The nonlinear spatiotemporal processing of the cochleas 60, 70 makes nontrivial the mathematical characterization of a stereausis output for a given binaural signal. Therefore, a description of the spatiotemporal response of the silicon cochleas 60, 70 in connection with FIGS. 4–7 is provided to illustrate the operation of the stereausis chip 30.

Figure 4:
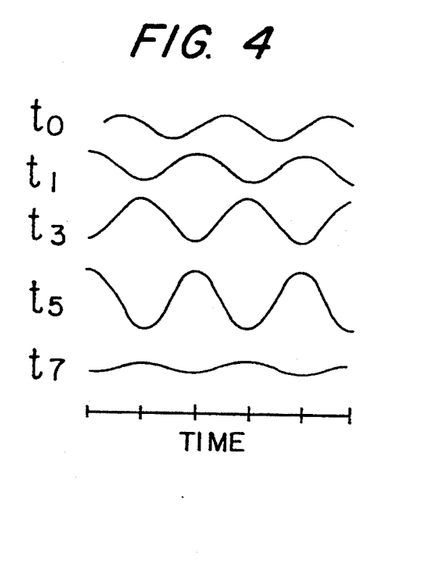
FIG. 4 illustrates cochlear response at a low-frequency sinuosity, at five taps along the traveling wave structure ($t_0$, $t_1$, $t_3$, $t_5$, $t_7$)

FIG. 4 shows the output at five positions along the silicon cochlea (e.g., at output lines $62_a$, $62_b$, $62_d$, $62_f$, $62_h$) in response to a low-frequency sinusoidal input. The waveform travels without significant damping through the high-frequency regions of the cochlea, shown at taps $t_0$, $t_1$, and $t_3$. As the waveform reaches the region tuned to its frequency, its output is maximum, as shown at tap $t_5$. For cochlear positions past this point, the traveling wave is damped rapidly, as shown at tap $t_7$. As can readily be appreciated, the processors $60_a \ldots, 70_a \ldots$ of the 1-D arrays 60, 70 (see FIG. 2) are individually tuned to respectively perform a plurality of low-pass filtering functions, wherein each said processor $60_a \ldots, 70_a \ldots$ is tuned such that higher-frequency signals and then lower-frequency signals are progressively filtered from the audible signals input into, and propagating through, the 1-D arrays 60, 70. Plotting the value of the signals at $t_0$, $t_1$, $t_3$, $t_5$, and $t_7$, at a particular moment in time, yields the spatial response of the cochlea, shown in FIG. 5. This plot highlights the exponentially-decreasing velocity of propagation of the traveling wave.

Figure 6:
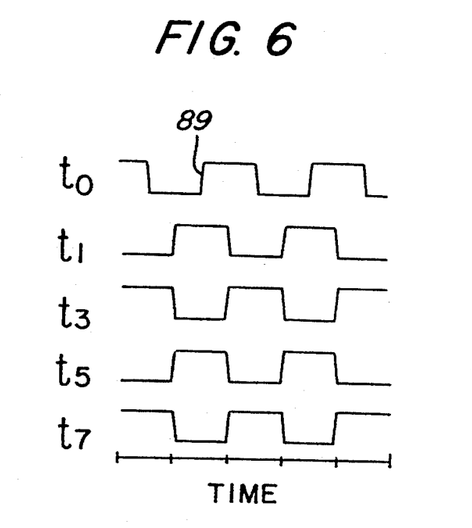
FIG. 6 shows intermediate processing and, more specifically, illustrates nonlinear thresholding, an aspect of data compression.
Figure 7:
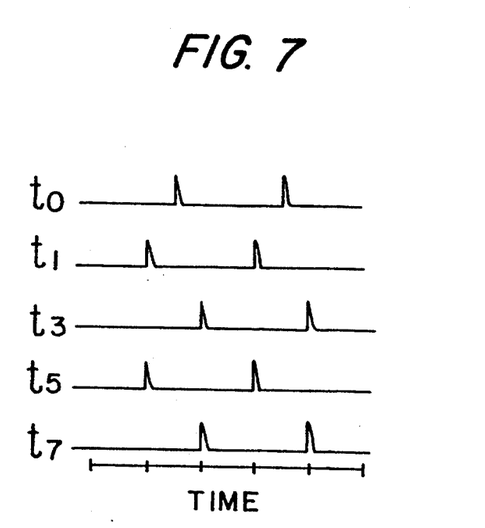
FIG. 7 shows final processing of the cochlear signals by the circuit model of sensory transduction.

FIG. 6 further illustrates the nonlinear waveshaping model of sensory transduction and, specifically, shows the output of a hysteretic differentiator performing the aforementioned differentiation function of the sensory transduction means. Such a differentiator produces a large voltage change 89 whenever the time derivative of its input changes sign. The sensory transduction means $63_a \ldots, 73_a \ldots$ (see FIG. 2) thereafter differentiate the waveforms of FIG. 6 (with an adjustable time constant) and perform halfwave rectifications, producing the final outputs of FIG. 7, which are provided to the 2-D array of comparator elements $80_{aa} \ldots$.

An intuitive feel for the correlation performed by the stereausis chip 30 may be had by considering visualizer outputs, e.g., of visualizer 50, for various input signals.

Figure 8A:
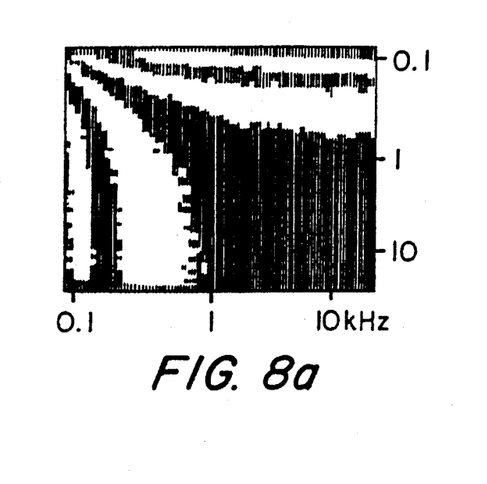
FIGS. 8a–8d are graphs depicting actual 2-D stereausis representations as displayed on a 2-D visualizer.
Figure 8B:
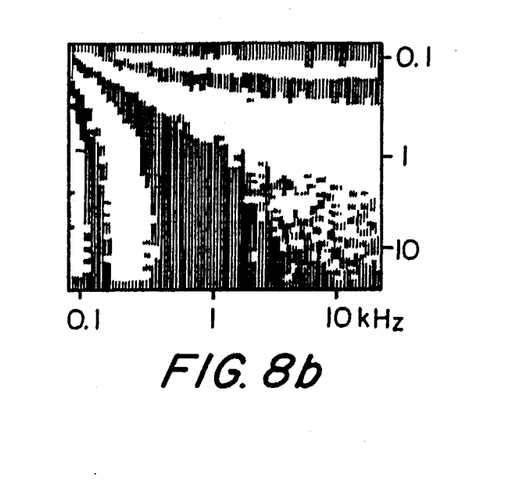
Figure 8C:
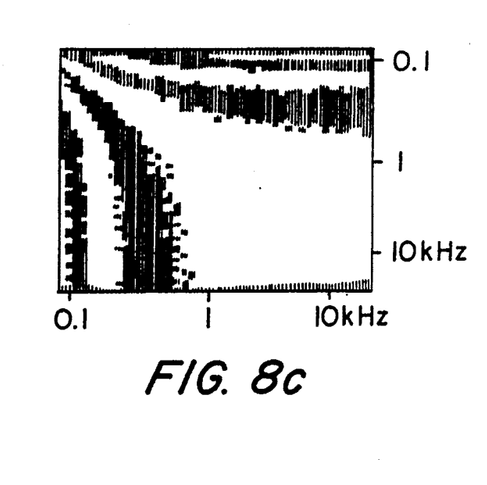

FIGS. 8a–8c show actual outputs of the stereausis chip in response to a 100-Hz sinusoid, presented binaurally with different interaural phase delays (IPD). FIG. 8a shows the chip response to a 0-radian IPD. The cochleas receive identical input, and send identical patterns to the array of comparison processors. A black stripe of correlation along the diagonal of the response reflects this similarity.

Figure 5:
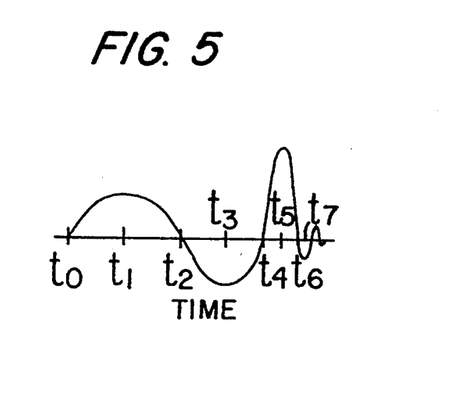
FIG. 5 shows spatial response of the cochlea to a low-frequency sinuosity, at a particular moment in time. Note that the markers ($t_0$, $t_1$, $t_3$, $t_5$, $t_7$) in FIG. 6 refer to the position of the waveforms in FIG. 5.

The off-diagonal response is the result of the correlation of the two spatial waves at different spatial shifts. Let us compare the output of the first tap of the left cochlea with the taps of the right cochlea (first column) for a traveling wave at time t=0 (FIG. 5). Within a certain distance ($x < t_1$ in FIG. 5), the phase shift of the sinusoid with respect to tap $t_0$ is smaller than $\pi/2$. The comparison elements within that distance display black, indicating correlation. Between the taps $t_1$ and $t_2$, the sinusoid is shifted progressively from $\pi/2$ to $\pi$ with respect to the sinusoid at tap $t_0$. In this region, the comparison elements display white, indicating anticorrelation. In the region of strong damping, a progressive phase shift is observed (between $t_2$ and $t_3$, a shift from $\pi$ to $3\pi/2$; between $t_3$ and $t_4$, a shift from $2\pi$ to $5\pi/2$; etc.), resulting in alternate correlation and anticorrelation stripes.

Due to the exponential decrease of the traveling-wave velocity, the distance needed to shift the sinusoid by $\pi/2$ decreases ($t_1-t_0 > t_2-t_1 > t_3-t_2 > t_4-t_3$), resulting in the curvature of the stripes. The output image is a pattern of curved stripes that is symmetric with respect to the diagonal, for a 0-radian IPD.

FIGS. 8b and 8c show the network result for IPDs of $\pi/2$ and $\pi$, respectively. When the signal is delayed at the input of one cochlea, the black correlation stripes are shifted from the diagonal toward the cochlea where the signal is delayed. Since the spatial disparity between the two traveling waves is proportional to the temporal delays between the two ears, the amount of shift is a measure of the interaural time delay. If the signal is delayed by an amount corresponding to a phase shift of $\pi$, the spatial waves are in counterphase and the solution is again symmetric with respect to the diagonal, with an anticorrelation stripe on the diagonal. Because the cochleas are acting like delay lines, the patterns reflect lateralization information using only the cochlear outputs, without requiring explicit neural delays.

The nonlinearities of the circuit model of sensory transduction act to compress the input signals; as a result, the output of the stereausis chip is relatively insensitive to the absolute and relative amplitudes of the signal inputs. In addition, the winner-take-all network in each comparison element introduces a logarithmic compression, which further reduces the amplitude information in the output of the stereausis chip. Alternative circuits for sensory-transduction models and comparison can be used to preserve amplitude information.

Figure 8D:
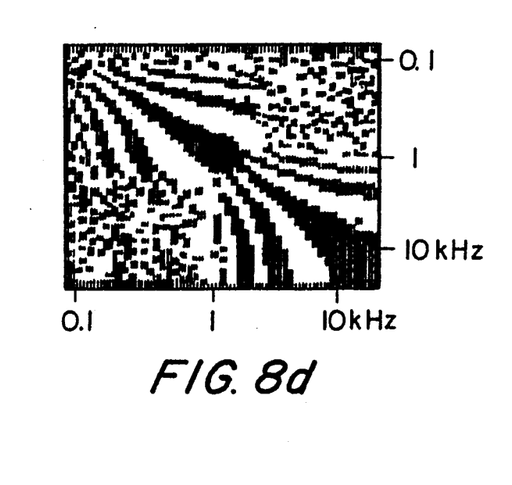
Figure 9A:
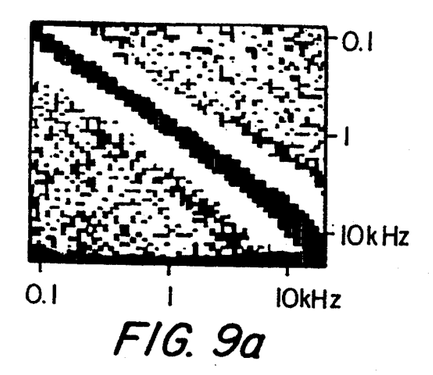
FIGS. 9a–9e are graphs depicting 2-D signatures or "fingerprints" characteristic of white noise.
Figure 9B:
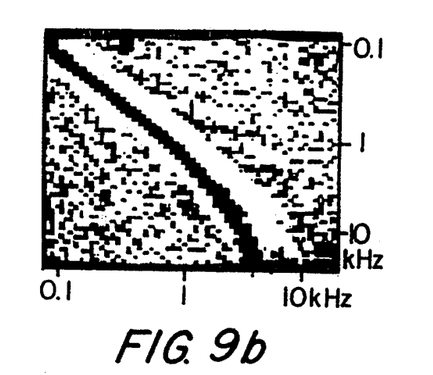
Figure 9C:
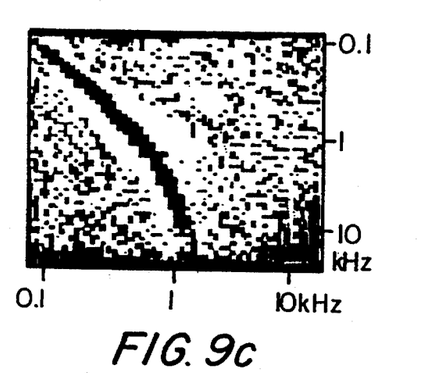
Figure 9D:
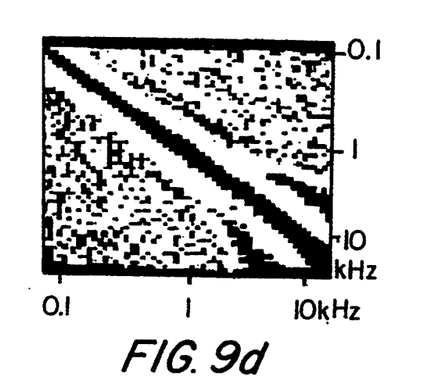
Figure 9E:
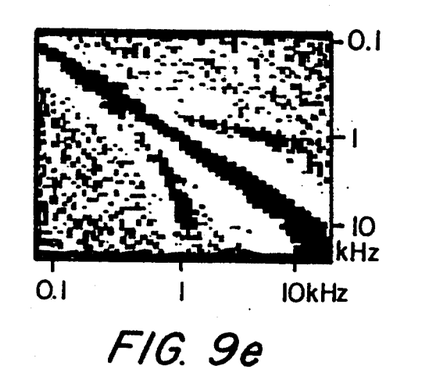

FIG. 8d shows the response to the sum of two pure tones (200 Hz and 2 kHz) presented monaurally. There are four distinct regions in the chip output. The upper-left corner shows the strong autocorrelation of the 200-Hz sinusoid. The other regions show the weak cross-correlation of the 200-Hz and 2-kHz sinusoids. In this way, the stereausis representation naturally segments monaural signals into distinct spectral regions.

The outputs 114, 116 of the comparison elements 80 may be scanned off the chip and displayed on a video monitor 50. The chip 30 preferably contains the scanning logic necessary to drive such a monitor, requiring only a few driver transistors and passive components off-chip. For FIGS. 8a–8d, extra off-chip circuitry mapped correlation to black and anticorrelation to white. Two-dimensional visualization of the stereausis process in real-time provides insight into the dynamics and efficient identification of specific noise sources within a plane formed by the origin 24 of the audible signal 22 and the two transducers 26 providing inputs to the chip 30. As shown in FIG. 1, a 3-D stereausis representation is constructed from a minimum of three such 2-D stereausis representations.

Location of a sound source from 2-D or 3-D output data may be accomplished by detecting a known data pattern, i.e., a "fingerprint" or "signature," which is characteristic of a particular acoustic signal. In this connection, reference is had to FIG. 9, which shows relatively simple patterns characteristic of white noise, which is created by, for example, an audible hissing sound. FIG. 9 includes the following photographs showing the output of a stereausis chip 30 in response to white noise: (a) chip response to the presentation of identical white noise signals to both inputs; (b) chip response to the binaural presentation of white noise, delayed 350 microseconds into the left input; (c) chip response to the binaural presentation of white noise, delayed 700 microseconds into the left input, and (d), (e) chip response to the presentation of identical comb-filtered white noise to both inputs, created by the addition of a white noise signal to a delayed replica of itself. Photo (d) shows chip response with a 350-microsecond delay, while photo (e) shows chip response with a 700-microsecond delay. Delays correspond in the preferred embodiment to differences in distance from the sound source to the respective transducer pair, e.g. $e_1$, $e_2$, feeding the chip 30.

In operation, the processor 40 locates and tracks the white noise pattern to detect the position of the source of the hiss with respect to the transducers $e_1$, $e_2$, $e_3$. Two-dimensional tracking using one of the chips 30 is straight-forward to implement. By concatenating three two-dimensional results, i.e., using the source position information in each of the two-dimensional portrayals, 3-D processor 40 defines the position of the noise source in three dimensions, according to known mathematical techniques.

An alternative detection approach is to use a trainable expert system. For example, a known audio source at differing locations is successively exposed to the system of FIG. 1, and the resulting 2-D or 3-D output patterns (visually illustrated, e.g., by FIGS. 8 or 9) are successively stored in a memory. When the system is in use, the 3-D processor 40 compares the received pattern to its data base of stored patterns and identifies the location of the sound source, e.g., a leak in a pipe. As is apparent, correlation data may be extracted in parallel from each circuit or chip 30a, 30b, 30c for processing. Other manners of detection based on the output of chips 30 in conjunction with artificial intelligence and array processing will be apparent to those skilled in the art.

A topology transform to the 3-D stereausis representation may be employed in certain approaches to compensate for distortions in the 3-D stereausis representation caused by acoustic properties characteristic of the conducting medium 20. For example, if the acoustic conducting medium is a pipe, an appropriate topology transform is applied to the 3-D stereausis representation of acoustic conduction within solid pipe; no such transform need be applied if the conducting medium is air.

Utilized in conjunction with computer drawings of pipe work, flanges, and couplings, the detection system 10 makes the immediate location of leaks possible. In a proposed application wherein specific acoustic "noise" is traced through solid parts, the effects that thermal foam and blanket isolation and/or multiwalled tubing would have on atmospheric acousticis are eliminated.

Furthermore, the system is configured for ultrasonic analysis by adjusting the bandwidth of components (e.g., filter stages in the left and right 1-D arrays) in the stereausis chip. Accordingly, the multiconfigurable detection system provides distributed filtering with a more advantageous signal-to-noise condition enabling locating audible sound sources apart from high-noise pandemonium in three-dimensional space.

Superior leak "noise" resolution and specificity are thus provided through the exclusion of audio noise, such as that associated with pumping and slush flow, for example. While acoustic propagation through metal parts provides the most direct means of locating noise emulating leaks, the technique is also applicable (and more generally deployed) for atmospheric propagation, for example, as might be used to detect the location of a drone aircraft.

To summarize, the outputs of each filter of the left and right 1-D arrays of a cochlea circuit 30 are simultaneously provided as inputs to a 2-D array of comparison elements which performs the complete cross-correlation function. When the audible sound reaches the filter tuned closest to its frequency, a high-amplitude signal is output from the output tap of that particular filter. Cochlear transduction circuitry detects this high-amplitude output, transforming it into a spike which is input into the 2-D array. Further processing of the spikes output from the various stages of the left and right 1-D arrays yields a body of data comprising a 2-D stereausis representation. Particular patterns of the data are associated with sounds originating from a particular location and having particular spectral characteristics.

Multiple 2-D stereausis representations, in different 2-D planes, are calculated by using multiple VLSI chips. The respective left and right transducers providing inputs to each of the stereausis chips are positioned within the acoustic energy conducting medium to define multiple, nonparallel 2-D planes. Accordingly, the information provided by multiple 2-D stereausis representations can be collectively manipulated to render a 3-D stereausis representation. Such a 3-D representation indicates the distance, direction, and sound signature (frequency, timbre, etc.) of an audible sound in the conducting medium.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

I claim:

1. A detection apparatus for generating information for use in location of a sound source, comprising:
   a first transducer and a second transducer which respectively output a first transducer signal and a second transducer signal, the first and second transducers being positioned within an acoustic energy conducting medium for detecting acoustic signals propagating through the conducting medium;
   means for generating a two-dimensional representation of the detected acoustic signals, the two-dimensional representation including data characteristic of the location of the source of the acoustic signals, said means for generating including respective circuit models of the left and right human cochleas, said circuit models producing a plurality of outputs, said means for generating further including means for cross-correlating the plurality of outputs from said circuit models; and
   means supplied with said data for recognizing particular patterns thereof to locate said sound source.

2. The apparatus of claim 1 wherein said means for generating comprises:
   a first one-dimensional array of analog processors electrically interconnected by a first plurality of output lines, the first array receiving a first array input signal comprising said first transducer signal, the respective processors of the first array being individually and adjustably tuned to collectively perform a cochlear transduction on the first array input signal as the first array input signal propagates through the first array, the cochlear transduction being derived from a nonlinear circuit model of a traveling wave structure of a human cochlea, the first array outputting a first plurality of tap waveforms on the first plurality of output lines; and a second one-dimensional array of analog processors electrically interconnected by a second plurality of output lines, the second array receiving a second array input signal comprising said second transducer signal, the respective processors of the second array being individually and adjustably tuned to collectively perform said cochlear transduction on the second array input signal as the second array input signal propagates through the second array, the second array outputting a second plurality of tap waveforms on the second plurality of output lines.

3. The apparatus of claim 2 wherein said means for generating further includes:

sensory transduction means for time differentiating, nonlinear waveshaping, and half-wave rectifying each of said tap waveforms of said first and second plurality of tap waveforms, the transduction means outputting a first plurality of positive inputs and a first plurality of negative inputs, both corresponding to said first plurality of tap waveforms, the transduction means outputting a second plurality of positive inputs and a second plurality of negative inputs, both corresponding to said second plurality of tap waveforms; and a two-dimensional array of analog comparison elements receiving and processing said first plurality of positive inputs, said first plurality of negative inputs, said second plurality of positive inputs, and said second plurality of negative inputs to generate said two-dimensional representation, the analog comparison elements effectively comparing said first array input signal at each of said first plurality of output lines with said second array input signal at each of said second plurality of output lines, while simultaneously comparing said second array input signal at each of said second plurality of output lines with said first array input signal at each of said first plurality of output lines.

4. A detection system for generating information for use in the location of a sound source, comprising:

at least three transducers including a first transducer, a second transducer, and a third transducer which respectively output a first transducer signal, a second transducer signal, and a third transducer signal, the at least three transducers being positioned within an energy conducting medium for detecting signals propagating through the conducting medium; and means for generating a three-dimensional representation of the detected signals, the three-dimensional representation including data characteristic of the location of the sound source, said means for generating comprising:

first processing means for receiving said first transducer signal and said second transducer signal, the first processing means including respective first circuit models of the left and right human cochlea, said first circuit models providing a plurality of outputs, the first processing means further including means for cross-correlating the plurality of outputs of said first circuit models, the first and second transducer signals being provided as respective inputs to a respective one of said first circuit models, the first processing means processing said first and second transducer signals to generate a first output data pattern;

second processing means for receiving said second transducer signal and said third transducer signal, the second processing means including respective second circuit models of the left and right human cochlea, said second circuit models providing a plurality of outputs, the second processing means further including means for cross-correlating the respective plurality of outputs of said second circuit models, the second and third transducer signals being provided as respective inputs to a respective one of said second circuit models, the second processing means processing said second and third transducer signals to generate a second output data pattern; and third processing means for receiving said third transducer signal and said first transducer signal, the third processing means including respective third circuit models of the left and right human cochlea, said third circuit models providing a plurality of outputs, the third processing means further including means for cross-correlating the respective plurality of outputs of said third circuit models, the third and first transducer signals being provided as respective inputs to one of said third circuit models, said third processing means processing said third and first transducer signals to generate a third output data pattern.

5. The detection system of claim 4 wherein said signals are acoustic signals.

6. The detection system of claim 4, further including:
means for receiving said first, second, and third output data patterns and responsive thereto to locate said sound source.

7. The detection system of claim 6 wherein each of said first, second, and third processing means comprises:

a first one-dimensional array of analog processors electrically interconnected by a first plurality of output lines, the first array receiving a first array input signal comprising one of said first, second, and third transducer signals, the respective processors of the first array collectively performing a cochlear transduction on the first array input signal as the first array input signal propagates through the first array, the cochlear transduction being derived from a nonlinear circuit model of a traveling wave structure of a human cochlea, the first array outputting a first plurality of tap waveforms on the first plurality of output lines;

a second one-dimensional array of analog processors electrically interconnected by a second plurality of output lines, the second array receiving a second array input signal comprising one of said first, second, and third transducer signals, the respective processors of the second array collectively performing said cochlear transduction on the second array input signal as the second array input signal propagates through the second array, the second array outputting a second plurality of tap waveforms on the second plurality of output lines; and means for processing said first plurality of tap waveforms with said second plurality of tap waveforms to generate said first, second, and third stereausis representation for said first, second, and third auditory processing means, respectively.

8. The detection system of claim 7 wherein respective said first array processors are individually tuned to selected frequencies to respectively perform a first plurality of low-pass filtering functions, each of said first array processors being tuned such that higher-frequency signals and then lower-frequency signals are progressively filtered from said first array input signal as said first array input signal propagates through said first array, and wherein said second array processors are individually tuned to selected respective frequencies to respectively perform a second plurality of low-pass filtering functions, each of said second array processors being tuned such that higher-frequency signals and then lower-frequency signals are progressively filtered from said second array input signal as said second array input signal propagates through said second array.

9. The detection system of claim 7 wherein each of said first, second, and third processing means further comprises:

sensory transduction means for time differentiating, nonlinear waveshaping, and half-wave rectifying each of said tap waveforms of said first and second plurality of tap waveforms, the transduction means outputting a first plurality of positive inputs and a first plurality of negative inputs, both corresponding to said first plurality of tap waveforms, the transduction means outputting a second plurality of positive inputs and a second plurality of negative inputs, both corresponding to said second plurality of tap waveforms.

10. The detection system of claim 9 wherein said means for processing comprises:

a two-dimensional array of analog comparison elements receiving and processing said first plurality of positive inputs, said first plurality of negative inputs, said second plurality of positive inputs, and said second plurality of negative inputs to generate one of said first, second, and third stereausis representations, the analog comparison elements effectively comparing said first array input signal, at each of said first plurality of output lines, with said second array input signal at each of said second plurality of output lines, while simultaneously comparing said second array input signal, at each of said second plurality of output lines, with said first array input signal at each of said first plurality of output lines.

11. A method of locating a signal source in an energy conducting medium, said medium including noise pandemonium, including the steps of:

providing first, second, and third transducer signals from at least three transducers positioned with respect to said conducting medium so as to derive said transducer signals therefrom;

generating first, second, and third output signals simultaneously from said transducer signals by supplying a plurality of pairs of said first, second and third transducer signals to circuitry including respective first, second, and third circuit models of the left and right human cochlea, the combination of transducer signals in each of said plurality of pairs being different from that of any of the other said plurality of pairs; and locating the signal source by analyzing said first, second, and third output signals.

12. The method of claim 11 wherein said signal source is an acoustic signal source.

* * * * *